US010640204B2

(12) United States Patent
Welsh et al.

(10) Patent No.: US 10,640,204 B2
(45) Date of Patent: May 5, 2020

(54) UNMANNED AERIAL VEHICLE WITH A TRI-WING CONFIGURATION

(71) Applicant: Amazon Technologies, Inc., Seattle, WA (US)

(72) Inventors: Ricky Dean Welsh, Bellevue, WA (US); Louis LeRoi LeGrand, III, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 408 days.

(21) Appl. No.: 14/637,323

(22) Filed: Mar. 3, 2015

(65) Prior Publication Data
US 2016/0375997 A1 Dec. 29, 2016

(51) Int. Cl.
*B64C 27/22* (2006.01)
*B64C 39/02* (2006.01)
(Continued)

(52) U.S. Cl.
CPC ............ *B64C 27/22* (2013.01); *B64C 23/069* (2017.05); *B64C 29/0025* (2013.01);
(Continued)

(58) Field of Classification Search
CPC ...... B64C 2201/0045; B64C 2201/027; B64C 2201/128; B64C 2201/104;
(Continued)

(56) References Cited

U.S. PATENT DOCUMENTS 1,003,885 A * 9/1911 Day ................... B64C 23/005
244/6
1,636,320 A * 7/1927 Montero ............. B64C 29/0025
416/164
(Continued)

FOREIGN PATENT DOCUMENTS

CN 2905657 5/2007
CN 102412530 A 4/2012
(Continued)

OTHER PUBLICATIONS

International Search Report and Written Opinion of PCT Application No. PCT/US2016/020300 dated May 18, 2016.
(Continued)

*Primary Examiner* — Jessica B Wong
(74) *Attorney, Agent, or Firm* — Athorus, PLLC

(57) ABSTRACT

This disclosure describes a configuration of an unmanned aerial vehicle (UAV) that includes a substantially polygonal perimeter frame and a central frame. The perimeter frame includes a front wing, a lower rear wing, and an upper rear wing. The wings provide lift to the UAV when the UAV is moving in a direction that includes a horizontal component. The UAV may have any number of lifting motors. For example, the UAV may include four lifting motors (also known as a quad-copter), eight lifting motors (octo-copter), etc. Likewise, to improve the efficiency of horizontal flight, the UAV may also include one or more thrusting motors and corresponding thrusting propellers. When the UAV is moving horizontally, the thrusting motor(s) may be engaged and
(Continued)

the thrusting propeller(s) will aid in the horizontal propulsion of the UAV.

12 Claims, 6 Drawing Sheets

(51) Int. Cl.
*B64C 23/06* (2006.01)
*B64C 29/00* (2006.01)
*B64C 39/04* (2006.01)
B64C 9/26 (2006.01)

(52) U.S. Cl.
CPC .............. *B64C 39/024* (2013.01); *B64C 9/26* (2013.01); *B64C 39/04* (2013.01); *B64C 2201/027* (2013.01); *B64C 2201/104* (2013.01); *B64C 2201/108* (2013.01); *B64C 2201/165* (2013.01)

(58) Field of Classification Search
CPC ........ B64C 2201/108; B64C 2201/165; B64C 1/16; B64C 5/08; B64C 27/08; B64C 27/20; B64C 27/22; B64C 27/26; B64C 39/04; B64C 9/26; B64C 29/0025; B64C 23/069
USPC ......................................... 244/217
See application file for complete search history.

(56) References Cited

U.S. PATENT DOCUMENTS

| | | | |
|---|---|---|---|
| 1,987,788 A * | 1/1935 | Morton | ................... B64C 39/00 244/56 |
| 3,856,238 A | 12/1974 | Malvestuto | |
| 4,589,611 A | 5/1986 | Ramme et al. | |
| 6,293,491 B1 | 9/2001 | Wobben | |
| 8,613,409 B2 * | 12/2013 | Cazals | ................... B64C 9/323 244/213 |
| 2006/0016931 A1 * | 1/2006 | Malvestuto | ............. B64C 3/385 244/45 R |
| 2006/0151666 A1 * | 7/2006 | VanderMey | ........ B64C 29/0016 244/12.3 |
| 2008/0001025 A1 * | 1/2008 | Said | ........................ B64C 3/385 244/13 |
| 2009/0050750 A1 * | 2/2009 | Goossen | ................ B64C 39/024 244/76 R |
| 2012/0012692 A1 * | 1/2012 | Kroo | ......................... B64C 3/56 244/6 |
| 2012/0153087 A1 | 6/2012 | Collette et al. | |
| 2013/0026303 A1 | 1/2013 | Wang | |
| 2013/0099048 A1 | 4/2013 | Fisher et al. | |
| 2013/0321169 A1 | 12/2013 | Bateman et al. | |
| 2014/0129056 A1 | 5/2014 | Criado | |
| 2014/0374532 A1 | 12/2014 | Duffy et al. | |
| 2015/0286216 A1 | 10/2015 | Miwa | |
| 2017/0327218 A1 * | 11/2017 | Morin | ..................... B64C 3/385 |

FOREIGN PATENT DOCUMENTS

| | | |
|---|---|---|
| CN | 103796917 A | 5/2014 |
| JP | S60500615 A | 5/1985 |
| JP | H04108095 A | 4/1992 |
| JP | 2001071998 A | 3/2001 |
| JP | 2004210266 A | 7/2004 |
| JP | 2010036889 A | 2/2010 |
| JP | 2013032147 A | 2/2013 |
| JP | 2013525185 A | 6/2013 |
| JP | 2013532601 A | 8/2013 |
| JP | 2013169972 A | 9/2013 |
| JP | 2013249058 A | 12/2013 |
| JP | 2014037219 A | 2/2014 |
| JP | 2014520726 A | 8/2014 |
| JP | 2014218105 A | 11/2014 |
| WO | 2006022813 A2 | 3/2006 |
| WO | 2009069109 A2 | 6/2009 |
| WO | 2011133944 A1 | 10/2011 |
| WO | 2012012474 A2 | 1/2012 |
| WO | 2013013084 A1 | 1/2013 |
| WO | 2014058351 A2 | 4/2014 |
| WO | 2014068982 A1 | 5/2014 |

OTHER PUBLICATIONS

Search Report dated Aug. 5, 2019, for corresponding CN Application No. 201680013298.7.

* cited by examiner

UNMANNED AERIAL VEHICLE WITH A TRI-WING CONFIGURATION

BACKGROUND

Multi-propeller aerial vehicles (e.g., quad-copters, octo-copters) are becoming more common. Many of these vehicles include a body configuration that will support the separation of the multiple propellers, the control components, the power supply (e.g., battery), etc.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
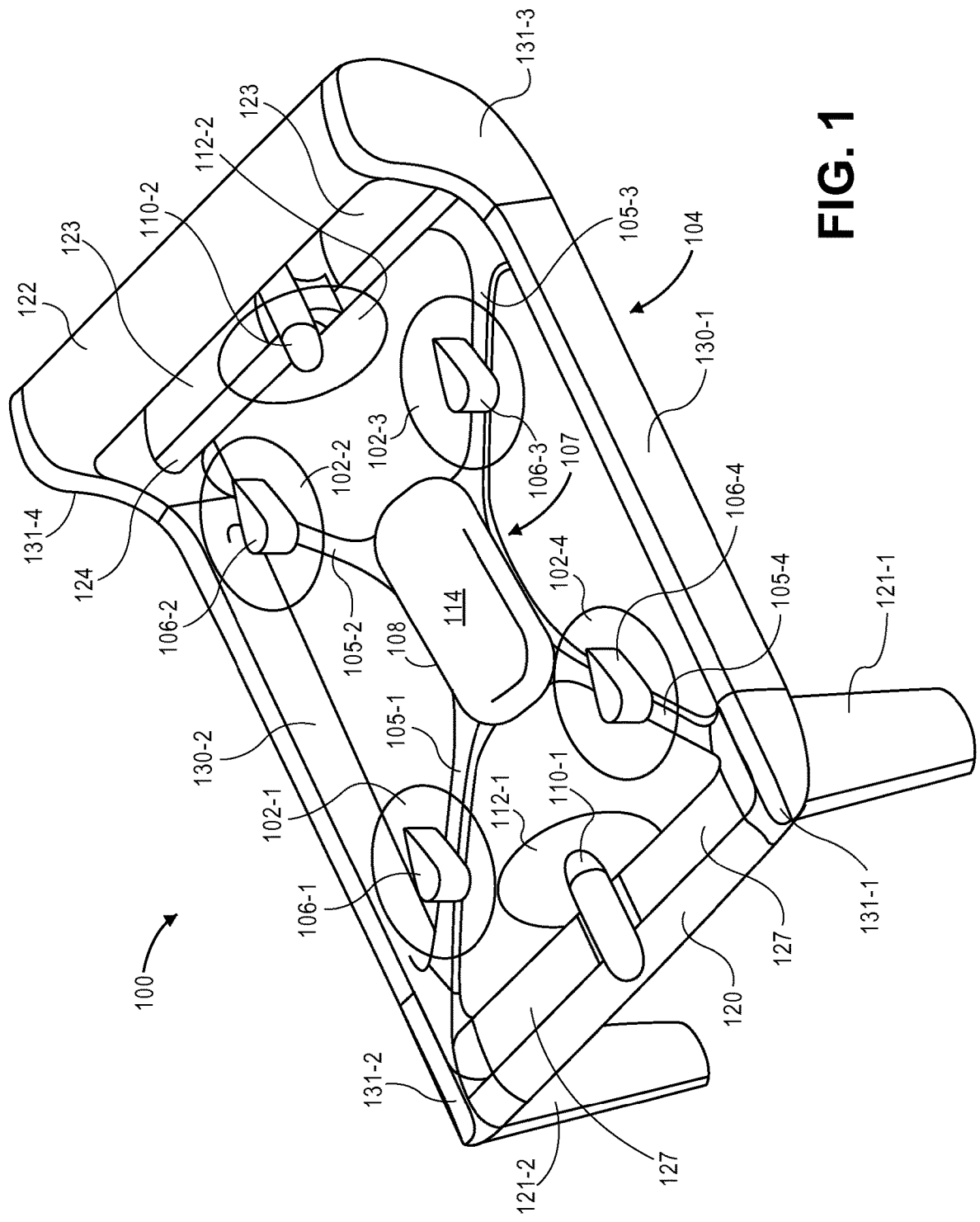
FIG. 1 depicts a view of an unmanned aerial vehicle configuration, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical. Furthermore, as used herein, "horizontal" flight refers to flight traveling in a direction substantially parallel to the ground (i.e., sea level), and that "vertical" flight refers to flight traveling substantially radially outward from the earth's center. It should be understood by those having ordinary skill that trajectories may include components of both "horizontal" and "vertical" flight vectors.

DETAILED DESCRIPTION

This disclosure describes a configuration of an unmanned aerial vehicle ("UAV") that includes a frame that provides structural support to the UAV, provides a protective barrier around the propellers of the UAV, and provides vertical lift to the UAV as the UAV moves in a direction that includes a horizontal component. In one implementation, the front of the frame may be shaped as a wing to provide vertical lift to the UAV when the UAV is moving in a direction that includes a horizontal component. Likewise, the rear of the frame may include one or more wings that also provide lift to the UAV when the UAV is moving in a direction that includes a horizontal component.

The front wing and the rear wing(s) may be coupled with horizontal side rails that extend from and connect the ends of each wing to form a substantially polygonal (e.g., rectangular, pentagonal, hexagonal, octagonal, etc.) perimeter frame for the UAV. The perimeter frame includes the front wing, the rear wing(s) and the two connecting side rails. In one implementation, the perimeter frame may be constructed in a substantially rectangular shape to encompass the lifting motors and corresponding lifting propellers to form a protective barrier around the lifting propellers. For example, a central frame may be formed within the substantially rectangular shape of the perimeter frame and coupled to the interior of the perimeter frame. The central frame may include a hub located near a center of the UAV from which multiple motor arms extend. Each motor arm may extend from the hub and couple with or otherwise terminate into a motor mount to which the corresponding lifting motors and lifting propellers are mounted. One or more support arms may extend from each motor mount and couple with or otherwise terminate into the interior of the perimeter frame. In some implementations, a permeable material (e.g., mesh, screen) may be affixed to the top and/or bottom of the perimeter frame that extends over the top and/or bottom of the interior of the perimeter frame and surrounds the lifting propellers of the UAV.

The UAV may have any number of lifting motors and corresponding lifting propellers. For example, the UAV may include four lifting motors and lifting propellers (also known as a quad-copter), eight lifting motors and lifting propellers (also known as an octo-copter), etc., each of which may be mounted to the central frame at corresponding motor mounts. Likewise, to improve the efficiency of horizontal flight, the UAV may also include one or more thrusting motors and thrusting propellers that are oriented at approximately ninety degrees to one or more of the lifting motors and/or the frame of the UAV. When the UAV is moving in a direction that includes a horizontal component, the thrusting motor(s) may be engaged and the thrusting propeller(s) will aid in the horizontal propulsion of the UAV. In some implementations, the rotational speed of the lifting motors may be reduced when the thrusting motor(s) is engaged, thereby improving efficiency and reducing power consumption of the UAV.

In some implementations, the frame may be formed of a single mold or uni-body design. In other implementations, one or more components of the perimeter frame and/or central frame may be coupled together. To further improve the efficiency of the UAV, in some implementations, the central frame, perimeter frame, and/or other components of the UAV may be formed of one or more lightweight materials, such as carbon fiber, graphite, machined aluminum, titanium, fiberglass, etc. Regardless of the material, each component (e.g., motor arms, wings, corner junctions, side rails) may be formed having a hollow inner cavity or may be formed around a lightweight core (e.g., foam, wood, plastic), thereby reducing weight, increasing structural rigidity and providing a channel through which one or more wires and/or cables may be passed and/or in which other components may be housed. For example, the motor arms may include both an inner core (e.g., foam, wood, plastic) and a hollow portion. The inner core, which may be formed of foam, wood, plastic, etc., or any combination thereof, provides increased dimensionality to the motor arms and helps increase the structural integrity of the motor arms. The hollow portion, or internal cavity, which may run along the top of the motor arm or through the interior of the motor arms, provides a channel through which wires, such as motor control wires, or any other UAV component (e.g., batteries, controllers, etc.) may be located.

In some implementations, the UAV may be configured so that the wires passing through the channels have multiple junctions to enable easy disassembly and/or parts replacement. For example, the motor wires may be configured with multiple separable junctions. For example, the motor wires may extend from the motor and have a separable junction at or near the motor, rather than having only a single junction where the motor wires connect to the electronic speed control ("ESC"). By having a separable junction for the motor wires near the motor, the motor can be easily removed and replaced without having to disassemble any other components of the UAV, access the UAV control system, or remove the motor wires from the UAV.

Figure 3:
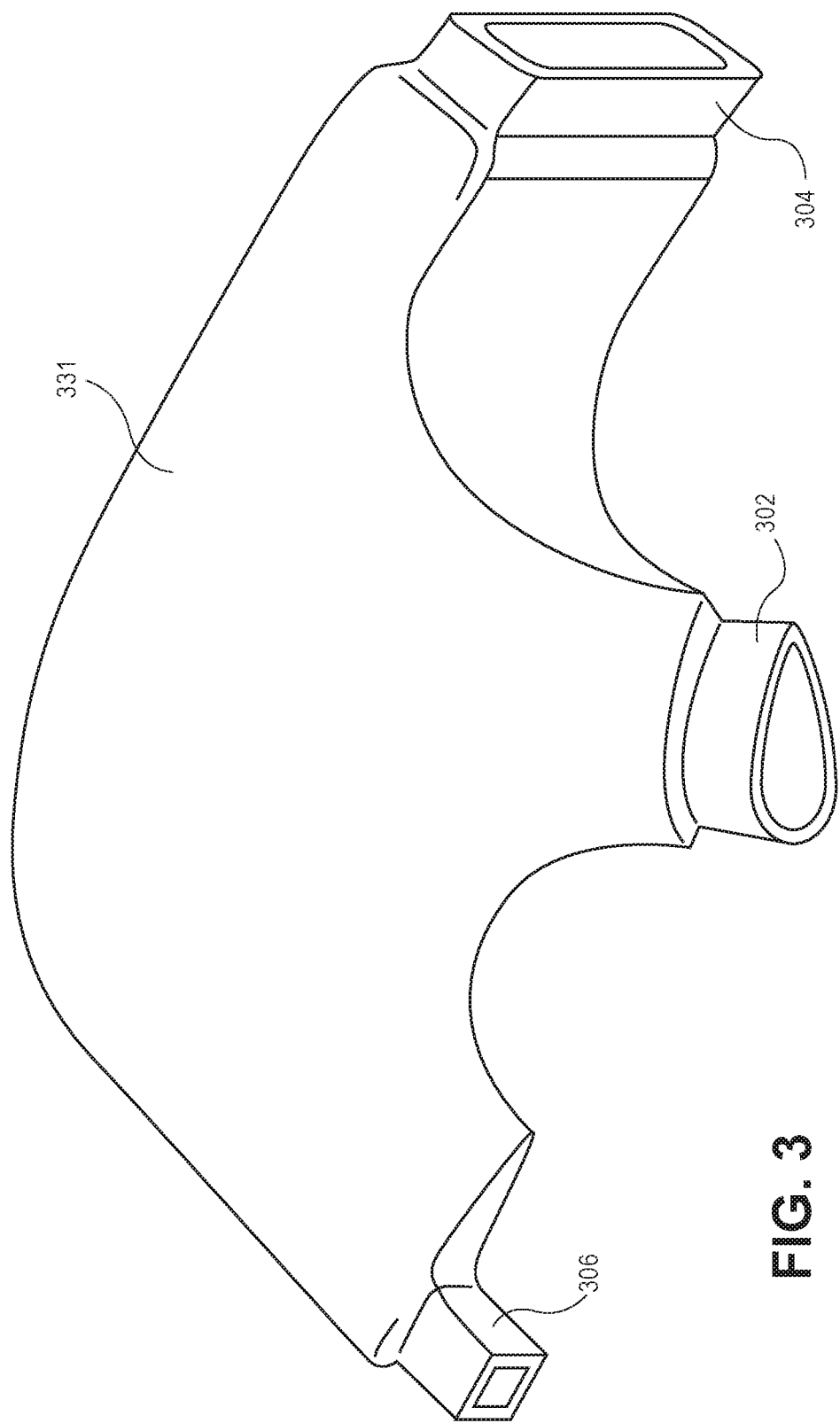
FIG. 3 depicts a view of a corner junction of an unmanned aerial vehicle, according to an implementation.

FIG. 1 illustrates a view of a UAV 100, according to an implementation. As illustrated, the UAV 100 includes a perimeter frame 104 that includes a front wing 120, a lower rear wing 124, an upper rear wing 122, and two horizontal side rails 130-1, 130-2. The horizontal side rails 130 are coupled to opposing ends of the front wing 120 and opposing ends of the upper rear wing 122 and lower rear wing 124. In some implementations, the coupling may be with a corner junction, such as the front left corner junction 131-1, the front right corner junction 131-2, the rear left corner junction 131-3, the rear right corner junction 131-4. In such an example, the corner junctions are also part of the perimeter frame 104. An example corner junction is discussed further below with respect to FIG. 3.

The components of the perimeter frame 104, such as the front wing 120, lower rear wing 124, upper rear wing 122, side rails 130-1, 130-2, and corner junctions 131 may be formed of any one or more suitable materials, such as graphite, carbon fiber, aluminum, titanium, etc., or any combination thereof. In the illustrated example, the components of the perimeter frame 104 of the UAV 100 are each formed of carbon fiber and joined at the corners using corner junctions 131. The components of the perimeter frame 104 may be coupled using a variety of techniques. For example, if the components of the perimeter frame 104 are carbon fiber, they may be fitted together and joined using secondary bonding, a technique known to those of skill in the art. In other implementations, the components of the perimeter frame 104 may be affixed with one or more attachment mechanisms, such as screws, rivets, latches, quarter-turn fasteners, etc., or otherwise secured together in a permanent or removable manner.

The front wing 120, lower rear wing 124, and upper rear wing 122 are positioned in a tri-wing configuration and each wing provides lift to the UAV 100 when the UAV is moving in a direction that includes a horizontal component. For example, the wings may each have an airfoil shape that causes lift due to the airflow passing over the wings during horizontal flight.

Opposing ends of the front wing 120 may be coupled to a corner junction 131, such as the front left corner junction 131-1 and front right corner junction 131-2. In some implementations, the front wing may include one or more flaps 127 or ailerons, that may be used to adjust the pitch, yaw, and/or roll of the UAV 100 alone or in combination with the lifting motors 106, lifting propellers 102, thrusting motors 110, thrusting propellers 112, and/or other flaps on the rear wings, discussed below. In some implementations, the flaps 127 may also be used as a protective shroud to further hinder access to the lifting propellers 102 by objects external to the UAV 100. For example, when the UAV 100 is moving in a vertical direction or hovering, the flaps 127 may be extended, as illustrated and discussed below with respect to FIG. 5, to increase the height of the protective barrier around a portion of the lifting propellers 102.

In some implementations, the front wing 120 may include two or more pairs of flaps 127, as illustrated in FIG. 1. In other implementations, for example if there is no front thrusting motor 110-1, the front wing 120 may only include a single flap 127 that extends substantially the length of the front wing 120. If the front wing 120 does not include flaps 127, the lifting motors 106 and lifting propellers 102, thrusting motors 110, thrusting propellers 112 and/or flaps of the rear wings may be utilized to control the pitch, yaw, and/or roll of the UAV 100 during flight.

Opposing ends of the lower rear wing 124 may be coupled to a corner junction 131, such as the rear left corner junction 131-3 and rear right corner junction 131-4. In some implementations, the lower rear wing may include one or more flaps 123 or ailerons, that may be used to adjust the pitch, yaw and/or roll of the UAV 100 alone or in combination with the lifting motors 106, lifting propellers 102, thrusting motors 110, thrusting propellers 112, and/or the flaps 127 of the front wing. In some implementations, the flaps 123 may also be used as a protective shroud to further hinder access to the lifting propellers 102 by objects external to the UAV 100. For example, when the UAV 100 is moving in a vertical direction or hovering, the flaps 123 may be extended, similar to the extending of the front flaps 127 of the front wing 120.

Figure 4:
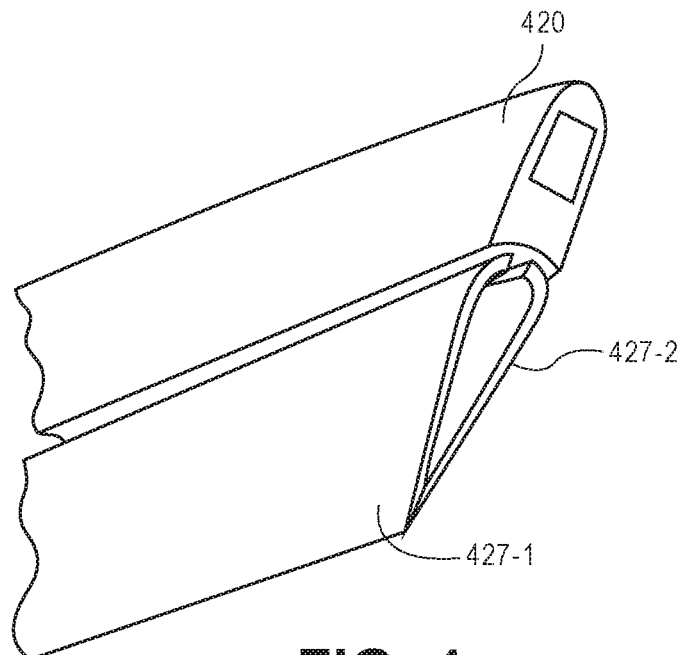
FIGS. 4-5 depict views of a portion of a front wing of an unmanned aerial vehicle, according to an implementation.
Figure 5:
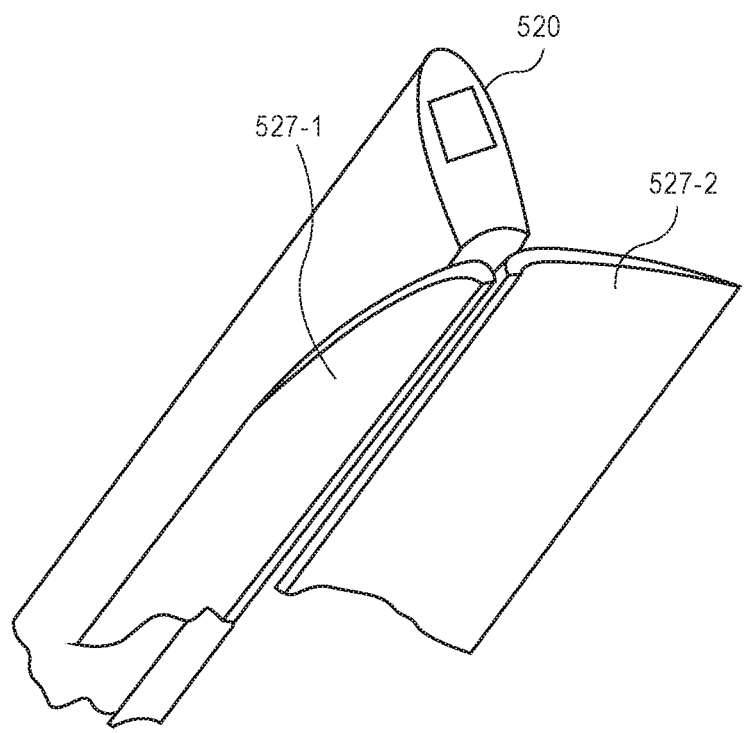

In some implementations, the rear wing 124 may include two or more flaps 123, as illustrated in FIG. 1 or two or more pairs of flaps, as shown in more detail as items 427 and 527 of FIGS. 4 and 5, respectively. In other implementations, for example if there is no rear thrusting motor 110-2 mounted to the lower rear wing, the rear wing 124 may only include a single flap 123 that extends substantially the length of the lower rear wing 124. In other implementations, if the lower rear wing includes two thrusting motors, the lower rear wing may be configured to include three flaps 123, one on either end of the lower rear wing 124, and one between the two thrusting motors mounted to the lower rear wing 124.

Opposing ends of the upper rear wing 122 may be coupled to a corner junction 131, such as the rear left corner junction 131-3 and rear right corner junction 131-4. In some implementations, like the lower rear wing, the upper rear wing 122 may include one or more flaps (not shown) or ailerons, that may be used to adjust the pitch, yaw and/or roll of the UAV 100 alone or in combination with the lifting motors 106, lifting propellers 102, thrusting motors 110, thrusting propellers 112, and/or other flaps of other wings. In some implementations, the flaps may also be used as a protective shroud to further hinder access to the lifting propellers 102 by objects external to the UAV 100. For example, when the UAV 100 is moving in a vertical direction or hovering, the flaps may be extended, similar to the extending of the front flaps 127 of the front wing 120 or the flaps 123 of the lower rear wing.

The front wing 120, lower rear wing 124, and upper rear wing 122 may be positioned and sized proportionally to provide stability to the UAV while the UAV 100 is moving in a direction that includes a horizontal component. For example, the lower rear wing 124 and the upper rear wing 122 are stacked vertically such that the vertical lift vectors generated by each of the lower rear wing 124 and upper rear wing 122 are close together, which may be destabilizing during horizontal flight. In comparison, the front wing 120 is separated from the rear wings longitudinally such that the vertical lift vector generated by the front wing 120 acts together with the vertical lift vectors of the lower rear wing 124 and the upper rear wing 122, providing efficiency, stabilization and control.

In some implementations, to further increase the stability and control of the UAV 100, one or more winglets 121, or stabilizer arms, may also be coupled to and included as part of the perimeter frame 104. In the example illustrated with respect to FIG. 1, there are two front winglets 121-1 and 121-2 mounted to the underneath side of the front left corner junction 131-1 and the front right corner junction 131-2, respectively. The winglets 121 extend in a downward direction approximately perpendicular to the front wing 120 and side rails 130. Likewise, the two rear corner junctions 131-3, 131-4 are also formed and operate as winglets providing additional stability and control to the UAV 100 when the UAV 100 is moving in a direction that includes a horizontal component.

The winglets 121 and the rear corner junctions 131 may have dimensions that are proportional to the length, width, and height of the UAV 100 and may be positioned based on the approximate center of gravity of the UAV 100 to provide stability and control to the UAV 100 during horizontal flight. For example, in one implementation, the UAV 100 may be approximately 64.75 inches long from the front of the UAV 100 to the rear of the UAV 100 and approximately 60.00 inches wide. In such a configuration, the front wing 120 has dimensions of approximately 60.00 inches by approximately 7.87 inches. The lower rear wing 124 has dimensions of approximately 60.00 inches by approximately 9.14 inches. The upper rear wing 122 has dimensions of approximately 60.00 inches by approximately 5.47 inches. The vertical separation between the lower rear wing and the upper rear wing is approximately 21.65 inches. The winglets 121 are approximately 6.40 inches wide at the corner junction with the perimeter frame of the UAV, approximately 5.91 inches wide at the opposing end of the winglet and approximately 23.62 inches long. The rear corner junctions 131-3, 131-4 are approximately 9.14 inches wide at the end that couples with the lower rear wing 124, approximately 8.04 inches wide at the opposing end, and approximately 21.65 inches long. The overall weight of the UAV 100 is approximately 50.00 pounds.

Coupled to the interior of the perimeter frame 104 is a central frame 107. The central frame 107 includes a hub 108 and motor arms 105 that extend from the hub 108 and couple to the interior of the perimeter frame 104. In this example, there is a single hub 108 and four motor arms 105-1, 105-2, 105-3, and 105-4. Each of the motor arms 105 extend from approximately a corner of the hub 108 and couple or terminate into a respective interior corner of the perimeter frame. As discussed below with respect to FIG. 2, in some implementations, each motor arm 105 may couple into a corner junction 131 of the perimeter frame 104. Like the perimeter frame 104, the central frame 107 may be formed of any suitable material, such as graphite, carbon fiber, aluminum, titanium, etc., or any combination thereof. In this example, the central frame 107 is formed of carbon fiber and joined at the corners of the perimeter frame 104 at the corner junctions 131. Joining of the central frame 107 to the perimeter frame 104 may be done using any one or more of the techniques discussed above for joining the components of the perimeter frame 104.

Lifting motors 106 are coupled at approximately a center of each motor arm 105 so that the lifting motor 106 and corresponding lifting propeller 102 are within the substantially rectangular shape of the perimeter frame 104. In one implementation, the lifting motors 106 are mounted to an underneath or bottom side of each motor arm 105 in a downward direction so that the propeller shaft of the lifting motor that mounts to the lifting propeller 102 is facing downward. In other implementations, as illustrated in FIG. 1, the lifting motors 106 may be mounted to a top of the motor arms 105 in an upward direction so that the propeller shaft of the lifting motor that mounts to the lifting propeller 102 is facing upward. In this example, there are four lifting motors 106-1, 106-2, 106-3, 106-4, each mounted to an upper side of a respective motor arm 105-1, 105-2, 105-3, and 105-4.

In some implementations, multiple lifting motors may be coupled to each motor arm 105. For example, while FIG. 1 illustrates a quad-copter configuration with each lifting motor mounted to a top of each motor arm, a similar configuration may be utilized for an octo-copter. For example, in addition to mounting a motor 106 to an upper side of each motor arm 105, another lifting motor may also be mounted to an underneath side of each motor arm 105 and oriented in a downward direction. In another implementation, the central frame may have a different configuration, such as additional motor arms. For example, eight motor arms may extend in different directions and a lifting motor may be mounted to each motor arm.

The lifting motors may be any form of motor capable of generating enough rotational speed with the lifting propellers 102 to lift the UAV 100 and any engaged payload, thereby enabling aerial transport of the payload.

Mounted to each lifting motor 106 is a lifting propeller 102. The lifting propellers 102 may be any form of propeller (e.g., graphite, carbon fiber) and of a size sufficient to lift the UAV 100 and any payload engaged by the UAV 100 so that the UAV 100 can navigate through the air, for example, to deliver a payload to a delivery location. For example, the lifting propellers 102 may each be carbon fiber propellers having a dimension or diameter of twenty-four inches. While the illustration of FIG. 1 shows the lifting propellers 102 all of a same size, in some implementations, one or more of the lifting propellers 102 may be different sizes and/or dimensions. Likewise, while this example includes four lifting propellers 102-1, 102-2, 102-3, 102-4, in other implementations, more or fewer propellers may be utilized as lifting propellers 102. Likewise, in some implementations, the lifting propellers 102 may be positioned at different locations on the UAV 100. In addition, alternative methods of propulsion may be utilized as "motors" in implementations described herein. For example, fans, jets, turbojets, turbo fans, jet engines, internal combustion engines, and the like may be used (either with propellers or other devices) to provide lift for the UAV.

In addition to the lifting motors 106 and lifting propellers 102, the UAV 100 may also include one or more thrusting motors 110 and corresponding thrusting propellers 112. The thrusting motors and thrusting propellers may be the same or different than the lifting motors 106 and lifting propellers 102. For example, in some implementations, the thrusting propellers may be formed of carbon fiber and be approximately eighteen inches long. In other implementations, the thrusting motors may utilize other forms of propulsion to propel the UAV. For example, fans, jets, turbojets, turbofans, jet engines, internal combustion engines, and the like may be used (either with propellers or with other devices) as the thrusting motors.

The thrusting motors and thrusting propellers may be oriented at approximately ninety degrees with respect to the perimeter frame 104 and central frame 107 of the UAV 100 and utilized to increase the efficiency of flight that includes a horizontal component. For example, when the UAV 100 is traveling in a direction that includes a horizontal component, the thrusting motors may be engaged to provide a horizontal thrust force via the thrusting propellers to propel the UAV 100 horizontally. As a result, the speed and power utilized by the lifting motors 106 may be reduced. Alternatively, in selected implementations, the thrusting motors may be oriented at an angle greater or less than ninety degrees with respect to the perimeter frame 104 and the central frame 107 to provide a combination of thrust and lift.

In the example illustrated in FIG. 1, the UAV 100 includes two thrusting motors 110-1, 110-2 and corresponding thrusting propellers 112-1, 112-2. Specifically, in the illustrated example, there is a front thrusting motor 110-1 coupled to and positioned near an approximate mid-point of the front wing 120. The front thrusting motor 110-1 is oriented such that the corresponding thrusting propeller 112-1 is positioned inside the perimeter frame 104. The second thrusting motor is coupled to and positioned near an approximate mid-point of the lower rear wing 124. The rear thrusting motor 110-2 is oriented such that the corresponding thrusting propeller 112-2 is positioned inside the perimeter frame 104.

While the example illustrated in FIG. 1 illustrates the UAV with two thrusting motors 110 and corresponding thrusting propellers 112, in other implementations, there may be fewer or additional thrusting motors and corresponding thrusting propellers. For example, in some implementations, the UAV 100 may only include a single rear thrusting motor 110 and corresponding thrusting propeller 112. In another implementation, there may be two thrusting motors and corresponding thrusting propellers mounted to the lower rear wing 124. In such a configuration, the front thrusting motor 110-1 may be included or omitted from the UAV 100. Likewise, while the example illustrated in FIG. 1 shows the thrusting motors oriented to position the thrusting propellers inside the perimeter frame 104, in other implementations, one or more of the thrusting motors 110 may be oriented such that the corresponding thrusting propeller 112 is oriented outside of the protective frame 104.

The perimeter frame 104 provides safety for objects foreign to the UAV 100 by inhibiting access to the lifting propellers 102 from the side of the UAV 100, provides protection to the UAV 100, and increases the structural integrity of the UAV 100. For example, if the UAV 100 is traveling horizontally and collides with a foreign object (e.g., wall, building), the impact between the UAV 100 and the foreign object will be with the perimeter frame 104, rather than a propeller. Likewise, because the frame is interconnected with the central frame 107, the forces from the impact are dissipated across both the perimeter frame 104 and the central frame 107.

Figure 2:
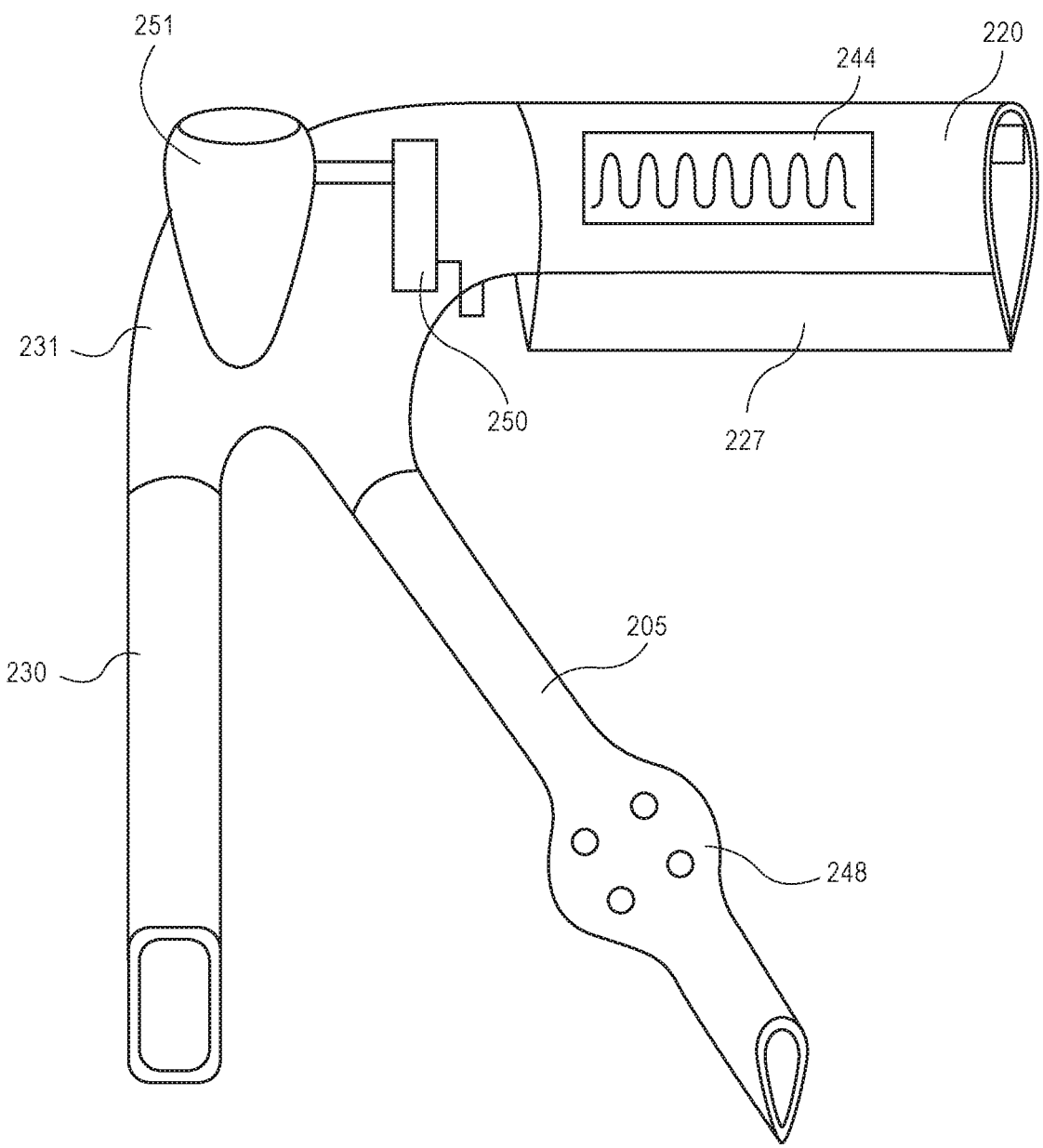
FIG. 2 depicts a view of a portion of an unmanned aerial vehicle perimeter frame, according to an implementation.

The perimeter frame 104 also provides a surface upon which one or more components of the UAV 100 may be mounted. Alternatively, or in addition thereto, one or more components of the UAV may be mounted or positioned within the cavity of the portions of the perimeter frame 104. For example, as illustrated in FIG. 2, one or more antennas may be mounted on or in the front wing 120. The antennas may be used to transmit and/or receive wireless communications. For example, the antennas may be utilized for Wi-Fi, satellite, near field communication ("NFC"), cellular communication, or any other form of wireless communication. Other components, such as cameras, time of flight sensors, accelerometers, inclinometers, distance-determining elements, gimbals, Global Positioning System (GPS) receiver/transmitter, radars, illumination elements, speakers, and/or any other component of the UAV 100 or the UAV control system (discussed below), etc., may likewise be mounted to or in the perimeter frame 104. Likewise, identification or reflective identifiers may be mounted to the perimeter frame 104 to aid in the identification of the UAV 100.

In some implementations, the perimeter frame 104 may also include a permeable material (e.g., mesh, screen) that extends over the top and/or lower surface of the perimeter frame 104 enclosing the central frame, lifting motors, and/or lifting propellers.

A UAV control system 114 is also mounted to the central frame 107. In this example, the UAV control system 114 is mounted to the hub 108 and is enclosed in a protective barrier. The protective barrier may provide the control system 114 weather protection so that the UAV 100 may operate in rain and/or snow without disrupting the control system 114. In some implementations, the protective barrier may have an aerodynamic shape to reduce drag when the UAV is moving in a direction that includes a horizontal component. The protective barrier may be formed of any materials including, but not limited to, graphite-epoxy, Kevlar, and/or fiberglass. In some implementations, multiple materials may be utilized. For example, Kevlar may be utilized in areas where signals need to be transmitted and/or received.

Likewise, the UAV 100 includes one or more power modules (not shown). As discussed below with respect to FIG. 6, the power modules may be positioned inside the cavity of the side rails 130-1, 130-2. In other implementations, the power modules may be mounted or positioned at other locations of the UAV. The power modules for the UAV may be in the form of battery power, solar power, gas power, super capacitor, fuel cell, alternative power generation source, or a combination thereof. For example, the power modules may each be a 6000 mAh lithium-ion polymer battery, or polymer lithium ion (Li-poly, Li-Pol, LiPo, LIP, PLI or Lip) battery. The power module(s) are coupled to and provide power for the UAV control system 114, the lifting motors 106, the thrusting motors 110, and the payload engagement mechanism (not shown).

In some implementations, one or more of the power modules may be configured such that it can be autonomously removed and/or replaced with another power module while the UAV is landed or in flight. For example, when the UAV lands at a location, the UAV may engage with a charging member at the location that will recharge the power module.

As mentioned above, the UAV 100 may also include a payload engagement mechanism (not shown). The payload engagement mechanism may be configured to engage and disengage items and/or containers that hold items (payload). In this example, the payload engagement mechanism is positioned beneath and coupled to the hub 108 of the frame 104 of the UAV 100. The payload engagement mechanism may be of any size sufficient to securely engage and disengage a payload. In other implementations, the payload engagement mechanism may operate as the container in which it contains item(s). The payload engagement mechanism communicates with (via wired or wireless communication) and is controlled by the UAV control system 114. Example payload engagement mechanisms are described in co-pending patent application Ser. No. 14/502,707, filed Sep. 30, 2014, titled "UNMANNED AERIAL VEHICLE DELIVERY SYSTEM," the subject matter of which is incorporated by reference herein in its entirety.

FIG. 2 depicts a partial view of a perimeter frame, with components joined at a front left corner junction, according to an implementation. The illustration in FIG. 2 includes a front left corner junction 231, a portion of a horizontal side rail 230, a portion of a front wing 220, and a portion of a motor arm 205. In this implementation, the corner junction includes an input/output component mounting location 251. The mounting location 251 may encase, enclose, or otherwise house one or more input/output components, such as an illumination element, camera, microphone, distance-determining element, GPS, accelerometer, inclinometer, speaker, etc. Likewise, a memory or computing module for the input/output component may also be incorporated into the corner junction 231. In some implementations, the mounting location 251 may provide a protective barrier or shield for the input/output component to protect the component from damage due to foreign objects, humidity, rain, etc. For example, a face or front of the mounting location 251 may include a transparent or semi-transparent shield that protects a mounted input/output component, such as a camera, from the external environment in which the UAV may be flown.

Also as illustrated in FIG. 2, the front wing 220 may include an antenna 244 that is surface mounted to a side of the front wing 220 or embedded inside the surface of the front wing 220. In implementations in which the antenna is embedded in the wing, the surface of the wing adjacent to or covering the antenna may be formed of a material, such as Kevlar, through which the antenna may radiate and/or receive waveform signals. Alternatively, or in addition thereto, the wing may include an open port near the antenna, thereby allowing the antenna to radiate and/or receive waveform signals through the open port. A motor 250, such as a servo motor, may also be incorporated into the corner junction 231 that is used to rotate and/or extend the flaps 227 of the wing.

The portion of the motor arm 205 illustrated in FIG. 2 shows a motor mount 248 to which one or more lifting motors may be mounted. As discussed above, the lifting motors may be mounted to the upper and/or underneath surface of the motor arm. For example, a lifting motor may be secured to the motor arm 205 at the motor mount 248 by passing screws through the openings in the motor mount 248 and securing the lifting motor to the motor mount 248 with the screws.

As illustrated, the components of the UAV, such as the side rail 230, corner junction 231, front wing 220, and/or motor arm 205 may include a hollow channel or cavity through which one or more UAV components, wires, or conduits carrying electrical, optical, hydraulic, pneumatic, or mechanical signals may be located. Likewise, the hollow channel or cavity may be used to aid in the coupling of the components together to form the UAV. For example, referring to FIG. 3, the corner junction 331 may be formed to include male extensions 302, 304, 306 that can be fitted into the cavity of other components of the UAV. For example, the male extension 304 may be formed to friction fit within the cavity of the side rail 230 (FIG. 2). Likewise, the male extension 306 may be formed to friction fit within the cavity of the front wing 220 (FIG. 2) and the male extension 302 may be formed to friction fit within the cavity of the motor arm 205 (FIG. 2). As components are friction fit together, they may be secured with a secondary bond. Alternatively, the components may be secured using one or more attachment mechanisms, such as screws, rivets, latches, quarter-turn fasteners, etc.

FIGS. 4 and 5 provide additional illustrations of the flaps 427 of the front wing 420, according to an implementation. As discussed above, the flaps 427 may be used as ailerons to provide additional controls to the UAV. For example, the flaps 427-1, 427-2 may move or rotate together as a single component to adjust the pitch, yaw, and/or roll of the UAV. Alternatively, the flaps may be separated and extended in opposite directions, as illustrated in FIG. 5, to increase the height of the perimeter frame around the lifting propellers. As illustrated in FIG. 5, the upper flap 527-1 of the wing 520 is rotated upward and the lower flap 527-2 is rotated downward into an extended position thereby increasing the overall height of the front wing 520. By extending the flaps 527, the height of the front wing, which acts as a protective barrier between objects external to the UAV and the lifting propellers, is increased. For example, when the UAV is travelling vertically or hovering, the flaps 527 may be extended, as illustrated in FIG. 5, to provide additional protection for objects external to the UAV. When the UAV is traveling in a horizontal direction, the flaps may be positioned as illustrated in FIG. 4 to reduce drag and/or may be rotated together to alter the pitch, yaw, and/or roll of the UAV.

Figure 6:
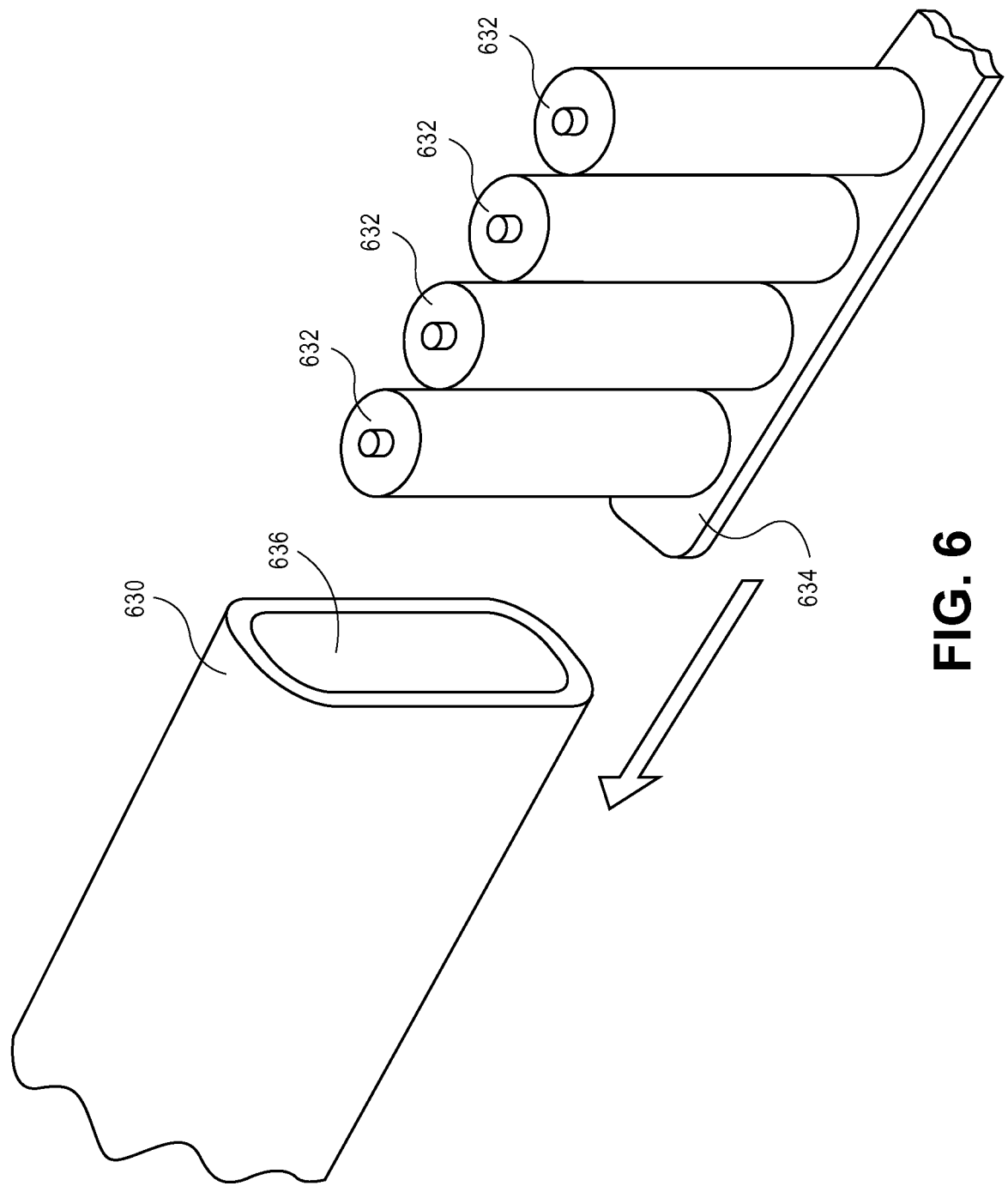
FIG. 6 depicts a view of a portion of an unmanned aerial vehicle side rail and power modules, according to an implementation.

FIG. 6 illustrates an example of the side rail 630 and power modules 632, according to an implementation. As discussed above, the power modules may be stored in the cavity 636 of the side rail 630. For example, the power modules 632 may be affixed to a power module container 634 that fits within and couples to the inner cavity 636 of the side rail 630. In some implementations, the cavity 636 may include grooves or ridges that are configured to receive the power module container 634 and/or to provide electrical connectivity between the power modules 632 and the UAV. In the example illustrated in FIG. 6, the power module container 634 and corresponding power modules 632 are fit within the cavity 636 of the side rail 630.

In other implementations, the side rail 630 may include an opening on the top, bottom, or side of the side rail 630 that is configured to receive the power module container 634 and power modules 632. For example, the side rail 630 may include an opening in the underneath side of the power module that is approximately the same size and shape as the power module container 634. The power modules may be passed through the opening into the cavity 636 of the side rail and the power module container 634 may fit into the opening and be secured to the side rail, thereby enclosing the power modules into the side rail 630. In such an implementation, the power modules may be removed without having to remove the side rail from the corner junction.

In still another example, the side rail 630 may function as a side rail and a power module. Rather than having a separate power module that may be inserted or removed from the side rail, the power modules 632 may be permanently incorporated into the side rail and the side rail(s) may be removed from the UAV and replaced with fully charged side rails. In such an example, the side rails with the incorporated power modules may be interchangeable across multiple UAVs.

Regardless of whether the power modules are removable or incorporated into the side rails, the power modules 632 may be charged while positioned in the side rail of the UAV. For example, the side rail may include a charge port that couples to a power source when the UAV is landed. The charge port provides power to and charges the power modules 632 when connected to the power source.

Figure 7:
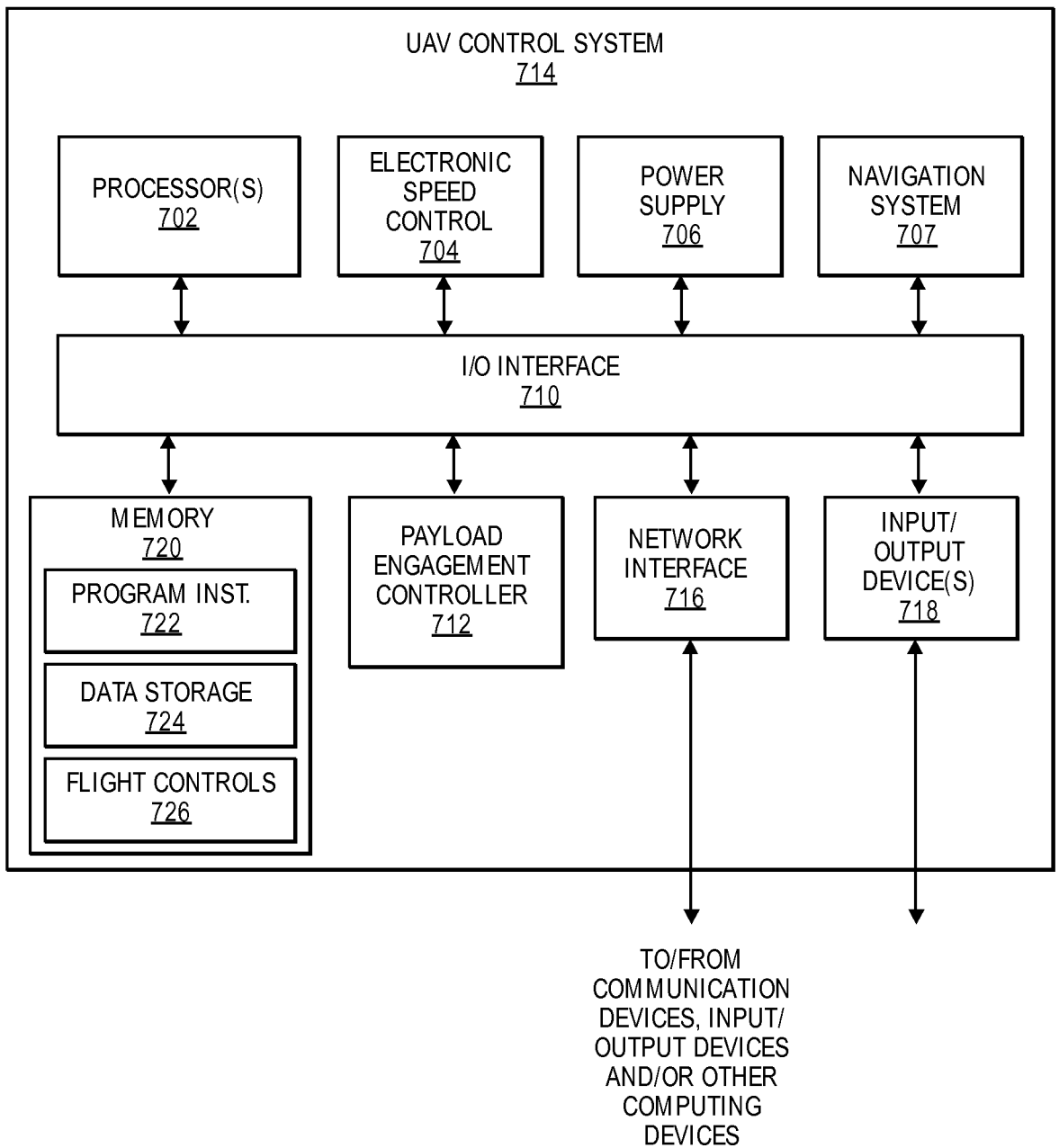
FIG. 7 is a block diagram of an illustrative implementation of an unmanned aerial vehicle control system that may be used with various implementations.

FIG. 7 is a block diagram illustrating an example UAV control system 714. In various examples, the block diagram may be illustrative of one or more aspects of the UAV control system 114 that may be used to implement the various systems and methods discussed herein and/or to control operation of the UAVs described herein. In the illustrated implementation, the UAV control system 714 includes one or more processors 702, coupled to a memory, e.g., a non-transitory computer readable storage medium 720, via an input/output (I/O) interface 710. The UAV control system 714 may also include electronic speed controls 704 (ESCs), power supply modules 706, a navigation system 707, and/or a payload engagement controller 712. In some implementations, the navigation system 707 may include an inertial measurement unit (IMU). The UAV control system 714 may also include a network interface 716, and one or more input/output devices 718.

In various implementations, the UAV control system 714 may be a uniprocessor system including one processor 702, or a multiprocessor system including several processors 702 (e.g., two, four, eight, or another suitable number). The processor(s) 702 may be any suitable processor capable of executing instructions. For example, in various implementations, the processor(s) 702 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 702 may commonly, but not necessarily, implement the same ISA.

The non-transitory computer readable storage medium 720 may be configured to store executable instructions, data, flight paths, flight control parameters, and/or data items accessible by the processor(s) 702. In various implementations, the non-transitory computer readable storage medium 720 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 720 as program instructions 722, data storage 724 and flight controls 726, respectively. In other implementations, program instructions, data, and/or flight controls may be received, sent, or stored upon different types of computer-accessible media, such as non-transitory media, or on similar media separate from the non-transitory computer readable storage medium 720 or the UAV control system 714. Generally speaking, a non-transitory, computer readable storage medium may include storage media or memory media such as magnetic or optical media, e.g., disk or CD/DVD-ROM, coupled to the UAV control system 714 via the I/O interface 710. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 716.

In one implementation, the I/O interface 710 may be configured to coordinate I/O traffic between the processor(s) 702, the non-transitory computer readable storage medium 720, and any peripheral devices, the network interface 716 or other peripheral interfaces, such as input/output devices 718. In some implementations, the I/O interface 710 may perform any necessary protocol, timing or other data transformations to convert data signals from one component (e.g., non-transitory computer readable storage medium 720) into a format suitable for use by another component (e.g., processor(s) 702). In some implementations, the I/O interface 710 may include support for devices attached through various types of peripheral buses, such as a variant of the Peripheral Component Interconnect (PCI) bus standard or the Universal Serial Bus (USB) standard, for example. In some implementations, the function of the I/O interface 710 may be split into two or more separate components, such as a north bridge and a south bridge, for example. Also, in some implementations, some or all of the functionality of the I/O interface 710, such as an interface to the non-transitory computer readable storage medium 720, may be incorporated directly into the processor(s) 702.

The ESCs 704 communicate with the navigation system 707 and adjust the rotational speed of each lifting motor and/or the thrusting motor to stabilize the UAV and guide the UAV along a determined flight path. The navigation system 707 may include a GPS, indoor positioning system (IPS), IMU or other similar systems and/or sensors that can be used to navigate the UAV 100 to and/or from a location. The payload engagement controller 712 communicates with actuator(s) or motor(s) (e.g., a servo motor) used to engage and/or disengage items.

The network interface 716 may be configured to allow data to be exchanged between the UAV control system 714, other devices attached to a network, such as other computer systems (e.g., remote computing resources), and/or with UAV control systems of other UAVs. For example, the network interface 716 may enable wireless communication between the UAV that includes the control system 714 and a UAV control system that is implemented on one or more remote computing resources. For wireless communication, an antenna of an UAV or other communication components may be utilized. As another example, the network interface 716 may enable wireless communication between numerous UAVs. In various implementations, the network interface 716 may support communication via wireless general data networks, such as a Wi-Fi network. For example, the network interface 716 may support communication via telecommunications networks, such as cellular communication networks, satellite networks, and the like.

Input/output devices 718 may, in some implementations, include one or more displays, imaging devices, thermal sensors, infrared sensors, time of flight sensors, accelerometers, pressure sensors, weather sensors, cameras, gimbals, landing gear, etc. Multiple input/output devices 718 may be present and controlled by the UAV control system 714. One or more of these sensors may be utilized to assist in landing as well as to avoid obstacles during flight.

As shown in FIG. 7, the memory may include program instructions 722, which may be configured to implement the example routines and/or sub-routines described herein. The data storage 724 may include various data stores for maintaining data items that may be provided for determining flight paths, landing, identifying locations for disengaging items, engaging/disengaging the thrusting motors, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV control system 714 is merely illustrative and is not intended to limit the scope of the present disclosure. In particular, the computing system and devices may include any combination of hardware or software that can perform the indicated functions. The UAV control system 714 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV control system 714. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the UAV control system 714 may be transmitted to the UAV control system 714 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other UAV control system configurations.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An unmanned aerial vehicle (UAV), comprising:
   a perimeter frame, including:
      a front portion including a front wing configured to provide lift to the UAV when the UAV is moving in a direction that includes a horizontal component;
      a rear portion including a first rear wing and a second rear wing positioned vertically above the first rear wing configured to provide lift to the UAV when the UAV is moving in the direction that includes the horizontal component;
      a first side rail joining the front portion and the rear portion;
      a second side rail joining the front portion and the rear portion; and
      wherein the perimeter frame has a substantially polygonal shape; and
      wherein no lifting motors are directly coupled to the perimeter frame; and
   a central frame positioned within the substantially polygonal shape of the perimeter frame and coupled to an interior of the perimeter frame;
   a thrusting motor coupled to one of the front wing or the first rear wing;
   a thrusting propeller coupled to the thrusting motor and oriented to generate a substantially horizontal thrust;
   wherein the thrusting motor and thrusting propeller are oriented so that at least a portion of the thrusting propeller is within the substantially polygonal shape of the perimeter frame;
   a plurality of lifting motors, each of the plurality of lifting motors coupled to the central frame; and
   a plurality of lifting propellers, each propeller coupled to a motor of the plurality of lifting motors, wherein each of the plurality of lifting propellers are within the substantially polygonal shape of the perimeter frame;
   wherein the perimeter frame surrounds the plurality of lifting motors and the plurality of lifting propellers associated with the UAV.

2. The UAV of claim 1, wherein:
   the front wing includes a plurality of flaps;
   each of the plurality of flaps is configured to be rotated together with respect to the front wing; and
   each of the plurality of flaps is configured to be extended in opposite directions to increase a height of the front wing.

3. The UAV of claim 1, further comprising an antenna element embedded in a surface of at least one of the front wing or the first rear wing.

4. The UAV of claim 1, further comprising:
   a second thrusting motor coupled to the other of the first rear wing and the front wing.

5. The UAV of claim 1, wherein the front portion of the perimeter frame further includes:
   a first winglet extending in a downward direction and substantially perpendicular to the front wing; and
   a second winglet extending in a downward direction and substantially perpendicular to the front wing, wherein the first winglet and the second winglet are configured to provide stability and control to the UAV when the UAV is moving in the direction that includes the horizontal component.

6. The UAV of claim 1, wherein the substantially polygonal shape of the perimeter frame is substantially rectangular.

7. An aerial vehicle, comprising:
   a perimeter frame, including:
      a front portion including a front wing;
      a rear portion including a first rear wing and a second rear wing positioned vertically above the first rear wing;
      a first side rail joining the front portion and the rear portion;
      a second side rail joining the front portion and the rear portion; and
      wherein the perimeter frame has a substantially polygonal shape; and
      wherein no lifting motors are directly coupled to the perimeter frame; and
   a central frame positioned within the substantially polygonal shape of the perimeter frame and coupled to the perimeter frame;
   a first thrusting motor coupled to at least one of the front wing or the first rear wing;
   a first thrusting propeller coupled to the first thrusting motor and oriented to generate a substantially horizontal thrust;
   wherein the first thrusting motor and the first thrusting propeller are oriented so that at least a portion of the first thrusting propeller is within the substantially polygonal shape of the perimeter frame;
a plurality of lifting motors, each of the plurality of lifting motors coupled to the central frame; and
a plurality of lifting propellers, each propeller coupled to a motor of the plurality of lifting motors;
wherein the perimeter frame surrounds the plurality of lifting motors and the plurality of lifting propellers associated with the aerial vehicle.

8. The aerial vehicle of claim 7, further comprising:
a second thrusting motor coupled to the other of the at least one of the front wing or the first rear wing and oriented to generate a substantially horizontal thrust.

9. The aerial vehicle of claim 7, further comprising:
a first winglet coupled to the front portion, extending in a downward direction and substantially perpendicular to the front wing; and
a second winglet coupled to the front portion, extending in a downward direction and substantially perpendicular to the front wing, wherein the first winglet and the second winglet provide stability and control to the aerial vehicle when the aerial vehicle is moving in a direction that includes a horizontal component.

10. An aerial vehicle, comprising:
a front wing;
a first rear wing;
a second rear wing positioned vertically above the first rear wing;
a first side rail joining the front wing, the first rear wing, and the second rear wing;
a second side rail joining the front wing, the first rear wing, and the second rear wing; and
a central frame positioned within a perimeter defined by the front wing, the first rear wing, the first side rail, and the second side rail, wherein no lifting motors are directly coupled to the perimeter defined by the front wing, the first rear wing, the first side rail, and the second side rail;
a plurality of lifting motors, each of the plurality of lifting motors coupled to the central frame;
at least one thrusting motor oriented substantially perpendicular to at least one of the plurality of lifting motors; and
a thrusting propeller coupled to the at least one thrusting motor and oriented to generate a substantially horizontal thrust;
wherein the perimeter defined by the front wing, the first rear wing, the first side rail, and the second side rail surrounds the plurality of lifting motors associated with the aerial vehicle;
wherein the at least one thrusting motor and the thrusting propeller are oriented so that at least a portion of the thrusting propeller is within the perimeter defined by the front wing, the first rear wing, the first side rail, and the second side rail.

11. The aerial vehicle of claim 10, further comprising:
a plurality of lifting propellers, each propeller coupled to a motor of the plurality of lifting motors.

12. The aerial vehicle of claim 10, further comprising:
a first winglet coupled to at least one of the front wing or the first side rail, extending in a downward direction and substantially perpendicular to the front wing; and
a second winglet coupled to at least one of the front wing or the second side rail, extending in a downward direction and substantially perpendicular to the front wing.

* * * * *